United States Patent [19]

Karass

[11] 3,874,985

[45] Apr. 1, 1975

[54] STRAPPING FORMED BY BONDING CO-EXTENDING FILAMENTS WITH A POLYMERIC COMPOSITION

[76] Inventor: Thomas John Karass, 411 Kindersley Ave., Mount Royal, Quebec, Canada

[22] Filed: Dec. 11, 1973

[21] Appl. No.: 423,731

[52] U.S. Cl............... 161/143, 57/154, 57/155, 57/164, 57/165, 117/126 GQ, 117/126 GB, 117/138.8 F, 117/161 UC, 117/161 UZ, 156/181, 156/332, 161/143, 161/144, 161/175, 161/176, 260/31.8 M, 260/897 B
[51] Int. Cl........................ D04h 3/02, D04h 3/12
[58] Field of Search.......... 161/143, 144, 175, 176; 260/897 B, 31.8 M; 156/181, 332; 57/154, 164, 155, 165; 117/126 GQ, 126 GB, 138.8 F, 161 UC, 161 UZ

[56] References Cited

UNITED STATES PATENTS

| 2,750,314 | 6/1956 | Bemmels | 161/144 |
| 3,028,281 | 4/1962 | Karass | 161/143 |
| 3,118,806 | 1/1964 | Grantham | 161/143 |
| 3,126,312 | 3/1964 | Nickerson | 161/144 |
| 3,497,574 | 2/1970 | Press | 260/897 B |
| 3,651,196 | 3/1972 | Starkweather | 260/897 B |

Primary Examiner—George F. Lesmes
Assistant Examiner—J. Cannon

[57] ABSTRACT

A flexible weftless tape for strapping consisting of a single ply of juxtaposed strands bonded together by an adhesive of a mixture of two copolymers, namely: a copolymer of vinyl acetate and ethylene and a copolymer of vinyl acetate and dibutyl maleate, said mixture including a suitable plasticizer.

10 Claims, No Drawings

STRAPPING FORMED BY BONDING CO-EXTENDING FILAMENTS WITH A POLYMERIC COMPOSITION

The present invention relates to tapes or straps formed of individual strands or yarns bonded together in parallel relationship and, more particularly, to such tapes wherein the strands are made of continuous filaments to obtain maximum tensional strength.

U.S. Pat. No. 3,118,806 dated Jan. 21, 1964 to W. G. Grantham and entitled: "WEFTLESS TAPE AND A METHOD FOR MANUFACTURE THEREOF" teaches a weftless tape made of a single ply of flexible strands of synthetic resin bonded one to another by an adhesive consisting essentially of a copolymer of vinyl chloride and vinylidene chloride with a specially selected plasticizer. Although this Patent mentions the use of polyester as a possible material to constitute the flexible strands, it has been found that the specific adhesive mentioned in the Patent is applicable only to rayon strands and is not suited for bonding or other materials, such as polyester strands. The bond between the specified adhesive and the polyester is very weak and, therefore, the tape has a very low resistance to transaxial tension, that is tension transverse to the strand direction, resulting in easy separation of the strands. Because viscose yarns have a relatively lower tensional strength than polyester yarns, it is highly desirable to provide strapping made of available materials having a much higher tensional strength.

It is therefore the general object of the invention to provide a weftless tape consisting of juxtaposed strands bonded together by a specifically selected adhesive, resulting in a tape specifically adapted for use as a strapping, which has very high tensional strength and in which the adhesive makes a firm bond to prevent separation of the strands in all normal application and despite repeated bending of the tape when passed around corners.

In accordance with the invention the tape consists of strands made of yarns selected from polyester, nylon and fibre glass, the strands being juxtaposed together, preferably in a single ply. The strands are preferably polyester yarns of tire cord grade and may have a denier ranging from about 200 to 60,000 and may be either single or plied yarns having twist factors from zero upwards, for example from 2½ to 9 and from 9 to 14 twists per inch.

The adhesive used to bond the various strands together is, in accordance with the invention, essentially a mixture of a copolymer of vinyl acetate and ethylene with a copolymer of vinyl acetate and dibutyl maleate, together with a plasticizer selected from dibutyl phthalate and di-ethylene glycol di-benzolate. Vinyl acetate and ethylene are copolymerized under high pressure, while vinyl acetate and dibutyl maleate are copolymerized under normal atmospheric pressure. The two copolymers are then blended in the presence of the above-noted plasticizer at a pH of not more than 4 to 6.

The adhesive of the invention is much better than previously known adhesives for bonding polyester, fibreglass or nylon strands in a weftless tape. The adhesive is applicable not only to first quality yarns of uniform cross-sectional area throughout their length, but also to yarns of second quality having a variable cross-sectional area resulting in strands of variable diameter along their length.

The following are preferred examples of copolymer formulae used as the adhesive and of the method for bonding the above specified strands together to make the tape.

EXAMPLE I

A first emulsion was prepared consisting of 88 percent by weight of vinyl acetate and 12 percent of ethylene with the emulsion containing 54 to 56 percent solids. This first emulsion was polymerized for two to four hours under 500 p.s.i. pressure.

A second emulsion was prepared using 70 percent by weight of vinyl acetate and 30 percent by weight of dibutyl maleate, this emulsion containing 54 to 56 percent solids. The second emulsion was polymerized under normal atmospheric pressure.

The two resulting copolymers were then blended in a proportion of three parts of the first copolymer for one part of the second polymer in the presence of a plasticizer consisting of about 5 percent by weight with respect to the entire mixture of a plasticizer consisting of about 5 percent by weight with respect to the entire mixture of dibutyl phthalate. The blending operation was carried out during a time varying between half an hour to 1 hour, depending upon the quantity. During blending, the pH was kept between 4 and 6. Blending was carried out until a final test showed a viscosity of not more than 3,000 centipoise on a Brookfield tester — model RVF — spindle No. 3 rotated at 20 r.p.m. at a temperature of 24° centigrade.

The resulting mixture was heated and used as a hot melt in a bath through which were passed several threads of polyester yarn of tire cord grade under constant longitudinal tension. The strands were caused to become parallel and continuous. The single ply tape thus formed, upon leaving the bath, was subjected to additional rolling transaxial pressure to compact the tape to substantially uniform width and to expel excess adhesive. The tape was then heated to cure the adhesive while the tape was constantly maintained under longitudinal tension. The cured and dried tape was finally wound into coils. The entire procedure was continuous.

The application of heat not only accelerates curing but causes the polyester yarn to shrink, thus "heat setting" the product.

The amount of adhesive employed to coat the individual strands is not critical. An amount calculated on the basis of a dry weight pick-up of between 15 and 50 percent, and preferably between 33 and 40 percent, has been found to be highly satisfactory.

The resulting tape has been found to be very highly flexible, completely water-proof and abrasion-proof, to have a very high tensile strength in the direction of the polyester strands and to resist separation of the strands to a high degree. The tape has very long useful life and the adhesive is not affected by sun light. Also, the adhesive used requires no pretreatment whatsoever of the polyester strands.

EXAMPLE II

The same formula was used as in Example I, except that the plasticizer was changed to diethylene glycol dibenzolate in an amount of 4 percent by weight of the blending mixture. As good results as Example I were obtained.

EXAMPLE III

The same formula as in Example I was used to coat strands of fibreglass yarns. A very good bond was obtained between the strands, similar to the bond achieved between polyester strands.

EXAMPLE IV

The same formula as in Example I was used to coat strands of nylon yarns. A very good bond was obtained between the strands, similar to the bond achieved between polyester strands.

EXAMPLE V

In a series of successive experiments, the adhesive of Example I was used to coat strands made of second quality yarns of either nylon, polyester or fibreglass and the resulting tapes had the same properties as tapes made of first quality yarns, while being less expensive.

Various other adhesive compositions using the same ingredients have been tried with substantially the same results and it has been found that in the first emulsion, the vinyl acetate can be varied by weight between 80 and 90 percent with the ethylene varying by weight correspondingly between 20 and 10 percent; that in the second emulsion, one could vary the amount of vinyl acetate between 60 and 80 percent with a corresponding variation of between 40 and 20 percent of the dibutyl maleate.

It has been found that the plasticizer which can be either dibutyl phthalate or di-ethylene glycol dibenzolate, can vary by weight of the total blending mixture between 1 and 5 percent.

The polymerization of the first emulsion can be carried out at a pressure varying between 400 and 700 p.s.i. The ratio of the first to the second copolymer in the blending mixture can vary between 2 to 1 and 4 to 1 with the ratio 3 to 1 being preferred.

I claim

1. A method of forming a weftless tape consisting of coating a plurality of flexible strands made of yarns selected from nylon, fibreglass and polyester, with a liquid mixture containing a plasticizer selected from dibutyl phthalate and di-ethylene glycol di-benzolate, a copolymer of vinyl acetate and ethylene and a copolymer of vinyl acetate and dibutyl maleate, bringing said strands together in parallel relationship on substantially the same plane and drying the formed tape.

2. A method as claimed in claim 1, wherein the amount by weight of the first copolymer is 2 to 4 times the amount by weight of the second copolymer and the plasticizer is present in an amount varying between 1 and 5 percent by weight of the total mixture.

3. A method as claimed in claim 2, wherein in the first copolymer, the amount of vinyl acetate varies between 80 and 90 percent and the amount of ethylene varies between 20 and 10 percent.

4. A method as claimed in claim 3, wherein in the second copolymer, the amount of vinyl acetate varies between 60 and 80 percent, and the amount of dibutyl maleate varies between 40 and 20 percent.

5. A method as claimed in claim 4, wherein the polymerization of the first copolymer is carried out under a pressure varying between 400 and 600 p.s.i.

6. A method as claimed in claim 1, wherein the mixture was made liquid by heating the same.

7. A weftless high strength packaging tape consisting essentially of twisted strands of continuous filaments of a material selected from nylon, fiberglass and polyester, said strands arranged in close parallel relationship and a binder material coating and adhering said strands one to another and comprising a mixture of first copolymer of vinyl acetate and ethylene and of a second copolymer of vinyl acetate and dibutyl maleate mixed together in a proportion of 2 to 4 parts of the first polymer per part by weight of the second copolymer, said binder material further including a plasticizer selected from dibutyl phthalate and di-ethylene glycol di-benzolate.

8. A weftless high strength packaging tape as claimed in claim 7, wherein in the first copolymer the amount of vinyl acetate varies between 80 and 90 percent and the amount of ethylene varies between 20 and 10 percent, while in the second copolymer the amount of vinyl acetate varies between 60 and 80 percent; and the amount of dibutyl maleate varies between 40 and 20 percent.

9. A weftless packaging tape as claimed in claim 8, wherein the polymerization of the first copolymer was carried out under a pressure varying between 400 and 600 p.s.i.

10. A weftless tape as claimed in claim 7, wherein the filaments have a non-uniform cross-sectional area throughout their length.

* * * * *